(12) United States Patent
Casoli

(10) Patent No.: US 11,519,787 B2
(45) Date of Patent: Dec. 6, 2022

(54) ISOTHERMAL PACKAGING DEVICE WITH TEMPERATURE MONITORING

(71) Applicant: EMBALL'ISO, Saint-Georges-de-Reneins (FR)

(72) Inventor: Pierre Casoli, Caluire et Cuire (FR)

(73) Assignee: EMBALL'ISO, Saint-Georges-de-Reneins (FR)

( * ) Notice: Subject to any disclaimer, the term of this patent is extended or adjusted under 35 U.S.C. 154(b) by 708 days.

(21) Appl. No.: 16/480,988

(22) PCT Filed: Jan. 30, 2018

(86) PCT No.: PCT/FR2018/050207
§ 371 (c)(1),
(2) Date: Jul. 25, 2019

(87) PCT Pub. No.: WO2018/138460
PCT Pub. Date: Aug. 2, 2018

(65) Prior Publication Data
US 2020/0003629 A1 Jan. 2, 2020

(30) Foreign Application Priority Data
Jan. 30, 2017 (FR) ...................... 1750729

(51) Int. Cl.
*G01K 1/14* (2021.01)
*B65D 81/18* (2006.01)
*B65D 81/38* (2006.01)

(52) U.S. Cl.
CPC .............. *G01K 1/14* (2013.01); *B65D 81/18* (2013.01); *B65D 81/3834* (2013.01); *B65D 2201/00* (2013.01)

(58) Field of Classification Search
CPC .... B65D 81/18; B65D 81/38; B65D 81/3834; B65D 85/00; B65D 2201/00; F25B 49/00; F25D 3/08; G01K 1/14
(Continued)

(56) References Cited

U.S. PATENT DOCUMENTS 4,845,959 A * 7/1989 Magee ............... B65D 81/3816
62/461
5,669,233 A * 9/1997 Cook ................. B65D 81/3823
62/457.2
(Continued)

FOREIGN PATENT DOCUMENTS

DE 102006057644 A1 6/2008
FR 2847237 A1 5/2004
(Continued)

OTHER PUBLICATIONS

Chou et al., "A Bluetooth-Smart Insulating Container for Cold-Chain Logistics", 2013 IEEE 6th International Conference on Service-Oriented Computing and Applications, IEEE, 2013, pp. 298-303.
(Continued)

*Primary Examiner* — Bryon P Gehman
(74) *Attorney, Agent, or Firm* — Womble Bond Dickinson (US)

(57) ABSTRACT

A device for conditioning products intended to maintain the products within a determined temperature range, including a first box of parallelepiped shape; a second box of parallelepiped shape. The second box having overall dimensions less than the first box is intended to be positioned inside the
(Continued)

first box in a removable manner. At least one thermal stabilisation element is intended to be positioned in a space formed between the first box and the second box. A temperature monitoring system includes a data monitoring unit and at least one temperature probe coupled to the monitoring unit. The monitoring unit is intended to be fixed onto the first box and the temperature probe is intended to be inserted into the second box. The second box includes a slot for positioning the temperature probe. The positioning slot maintains the temperature probe in position by compression.

15 Claims, 4 Drawing Sheets

(58) Field of Classification Search
USPC ................................ 62/129, 457.1–457.9
See application file for complete search history.

(56) References Cited

U.S. PATENT DOCUMENTS

| 10,549,900 | B2* | 2/2020 | McCormick | B65D 81/3834 |
| 2011/0193710 | A1* | 8/2011 | McIlvain | B60P 3/20 |
| | | | | 62/457.1 |
| 2013/0086933 | A1* | 4/2013 | Holtkamp | F25D 29/00 |
| | | | | 62/129 |
| 2014/0091098 | A1* | 4/2014 | Casoli | B65D 81/3818 |
| | | | | 220/592.2 |
| 2016/0347532 | A1* | 12/2016 | McCormick | F25D 3/08 |

FOREIGN PATENT DOCUMENTS

| GB | 2492195 A | 12/2012 |
| JP | 03-144328 A | 6/1991 |
| JP | 04-035571 U | 3/1992 |
| WO | 2016/118025 A1 | 7/2016 |

OTHER PUBLICATIONS

International Preliminary Reporton Patentability received for PCT Patent Application No. PCT/FR2018/050207, dated Aug. 8, 2019, 25 pages (14 pages of English Translation and 11 pages of Original Document).

International Search Report and Written Opinion received for PCT Patent Application No. PCT/FR2018/050207, dated Mar. 14, 2018, 29 pages (15 pages of English Translation and 14 pages of Original Document).

Preliminary Research Report and Written Opinion received for French Application No. 1750729, dated Oct. 18, 2017, 11 pages (1 page of French Translation Cover Sheet and 10 pages of original document).

* cited by examiner

ISOTHERMAL PACKAGING DEVICE WITH TEMPERATURE MONITORING

FIELD OF THE INVENTION

The present invention relates to devices for conditioning and transporting heat sensitive products, and more specifically isothermal boxes intended to maintain said products in determined temperature conditions.

PRIOR ART

In the logistics field, more specifically in the field of the transport and the storage of products, a certain number of containers have been developed having the aim of protecting said products from physical damage. However, food or pharmaceutical type products do not only have need of protection against impacts but also have to be maintained in stable temperature conditions during their transport and/or storage. Indeed, such thermal stability is necessary to avoid the products being damaged and rendered unusable, whether this damage is apparent or not. Such products sensitive to temperature variations are known as heat sensitive products.

The pharmacy field is the example the most representative of these thermal stability constraints, since medicines absolutely have to be maintained within determined temperature ranges in order to guarantee their effect. Medicines are generally contained in relative thin and fragile packaging which are not suited to guaranteeing the required thermal stability, and it is thus necessary to group together these medicines in specific containers making it possible to guarantee both the physical integrity of said medicines as well as their thermal stability over the transport and/or storage time.

Numerous solutions of isothermal boxes exist today that make it possible to maintain a particular product within a determined temperature range for a more or less long time.

These isothermal boxes, whatever their size, are generally composed of an outer envelope formed for example of a rigid material, which defines the outer volume of the isothermal conditioning device. This outer envelope generally takes the form of a box of parallelepiped shape that is going to be able to make it possible to protect the products to transport.

Inside this outer box is generally placed another box, known as inner box or inner basket, in which are positioned the products to condition. The fact of having an inner box placed within the outer envelope enables simpler handling of the products, notably when it is wished to remove all the products from the isothermal conditioning device.

Finally, one or more thermal stabilisation elements are positioned in a space formed between the outer envelope and the inner basket. Such thermal stabilisers are provided to maintain determined temperature conditions within the conditioning space formed by the inner basket, these stabilisers being chosen as a function of the external conditions, of transport notably.

Preferably, thermal insulation elements are also provided between the thermal stabilisers and the outer box, in order to reduce calorific loss through the walls of the outer box. For example, it is possible to provide thermal insulation panels formed of rigid foams, made from for example extruded or expanded polystyrene, polyurethane, or vacuum insulated panels (VIPs).

The monitoring of temperature inside the thermal conditioning device, notably at the level of the conditioned products, is of interest not just to transport professionals but also to contract givers. Indeed, such temperature monitoring makes it possible to take rapid actions when a deviation of the internal temperature is noted for example, without necessarily having to open the inner basket, by placing in a cold chamber for example or by the replacement of all or part of the thermal stabilisers.

To do so, thermal conditioning devices are increasingly equipped with temperature monitoring systems comprising a temperature sensor or probe and a monitoring unit, coupled to the temperature probe, and enabling communication with an external monitoring unit, with wireless technologies notably, such as radiofrequency, Wi-Fi, Bluetooth, etc.

An example of temperature monitoring in an isothermal conditioning device is proposed in the publication of Chou et al. entitled "A Bluetooth-Smart Insulating Container for Cold Chain Logistics" (Proceedings of the 2013 6th IEEE International Conference on Service Oriented Computing and Applications (SOCA)—1st International Workshop on Energy-smart Services and Applications (WESA'13) Kauai, Hi., USA, Dec. 16, 2013).

The temperature probes are coupled to the temperature monitoring unit of the wired or wireless conditioning device.

Wireless technologies are often preferred because they are simpler to implement, notably in configurations where the inner basket has to be inserted in the outer envelope with moreover the presence of thermal stabilisers. However, within the context of a reverse logistic, of a box rental, the use of wireless temperature probes poses a problem during unloading of the box. Indeed, the temperature probes that are positioned in the inner box are extracted from the outer box at the same time as the conditioned products and they are not systematically replaced in the thermal conditioning device after unloading.

Thus, the use of wired inner probes appears to be a solution that should avoid the loss of said probes, and thereby to enable their re-use in the isothermal conditioning device. There are however considerable risks of pull-out of the temperature probe at the moment of unloading and this thus makes the handling of the isothermal conditioning device more complex.

An aim of the present invention is thus to provide a solution for conditioning products to maintain them within a determined temperature range with temperature monitoring, this solution making it possible to resolve at least one of the aforesaid drawbacks.

In particular, an aim of the present invention is to propose a device for conditioning products in isothermal conditions with temperature monitoring, which may be re-used without making the handling of said conditioning device more complex.

DESCRIPTION OF THE INVENTION

To this end, a device for conditioning products intended to maintain said products within a determined temperature range is proposed, comprising
- a first box of parallelepiped shape;
- a second box of parallelepiped shape in which the products are intended to be conditioned, the second box having overall dimensions less than the first box and being intended to be positioned inside the first box, preferably in a removable manner;
- at least one thermal stabilisation element intended to be positioned in a space formed between the first box and the second box when the second box is positioned in the first box;

a temperature monitoring system comprising a data monitoring unit and at least one temperature probe coupled to the monitoring unit by at least one cable, characterised in that the monitoring unit is intended to be fixed onto the first box and in that the temperature probe is intended to be inserted into the second box, the second box comprising a slot for positioning the temperature probe, said positioning slot comprising a maintaining portion having a longitudinal shape and a width provided to maintain the temperature probe in position by compression.

Preferred but non-limiting aspects of this conditioning device, taken alone or in combination, are the following:

- the positioning slot further comprises at least one portion for releasing the temperature probe, said release portion having larger dimensions than the width of the maintaining portion so as to enable an insertion and/or an extraction of the temperature probe.
- the positioning slot comprises a release portion at at least one of the ends of the maintaining portion.
- The positioning slot comprises at least two release portions arranged respectively at each of the ends of the maintaining portion.
- the positioning slot is formed by a cut through a panel forming one of the walls of the second box.
- the positioning slot is formed by a cut of an edge of a panel forming one of the walls of the second box and by cooperation with an edge of a panel forming an adjacent wall during the manufacture of the second box.
- the second box further comprises a flap portion provided to assemble two adjacent panels, said flap portion comprising a cut in which the temperature probe is intended to be positioned.
- the second box comprises an upper wall, a lower wall opposite to the upper wall, and four peripheral walls perpendicular two by two and opposite two by two and each extending between the upper wall and the lower wall, the positioning slot being formed at the level of one of the panels forming the peripheral walls and preferentially along a direction extending between the lower wall and the upper wall.
- the second box comprises a plurality of positioning slots making it possible to position the temperature probe at various positions or to position several temperature probes in the second box.
- the temperature monitoring system comprises at least one additional temperature probe coupled to the monitoring unit, said additional temperature probe being intended to be positioned on the first box to measure the temperature at the level of the first box.
- the additional temperature probe is integrated in the monitoring unit.
- the monitoring unit comprises means for acquiring, processing, recording and/or communicating data coming from the at least one temperature probe.
- the monitoring unit is in the form of a card intended to be fixed onto an inner wall of the first box.
- the first box comprises on an inner wall a housing intended to receive the monitoring unit.
- the device further comprises at least one thermal insulation panel intended to be positioned in a space formed between the first box and the at least one thermal stabilisation element.

DESCRIPTION OF THE FIGURES

Other characteristics and advantages of the invention will further become clear from the description that follows, which is purely illustrative and non-limiting and which should be read with regard to the appended drawings, in which.

DETAILED DESCRIPTION OF THE INVENTION

Figure 1:
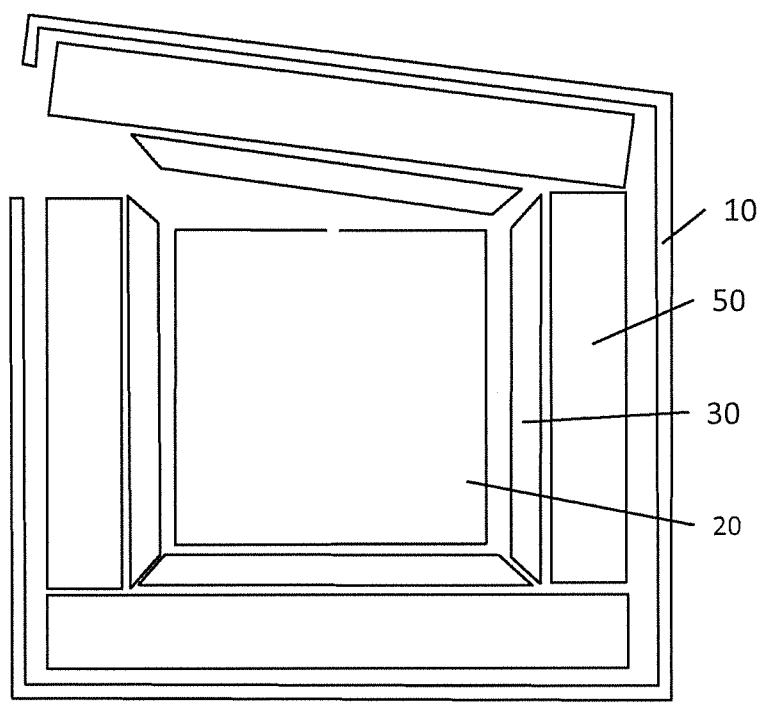
FIG. 1 is a schematic representation of an isothermal conditioning device.

The device for conditioning products to maintain the products within a determined temperature range has a layout of the type of that illustrated in FIG. 1, that is to say that it comprises a first box 10 of parallelepiped shape, known as outer box, in which is inserted a second box 20 of parallelepiped shape also, known as inner box, in which the products are intended to be conditioned. As will be seen hereafter, the inner box may be inserted into or extracted from the outer box as a function of needs, and it is thus in this respect removable with respect to the outer box.

As specified above, the conditioning device comprises at least one thermal stabilisation element 30 intended to be positioned in the space formed between the outer box and the inner box.

Preferably, several thermal stabilisation elements 30 are provided, arranged so as to surround the totality of the inner box, in order to act on the whole of the inner box. Thus, there will be thermal stabilisers on the periphery of the inner box, but also preferably below and above the inner box.

Such thermal stabilisers are generally rigid or semi-rigid briquettes formed of a plastic envelope (for example high density polyethylene HDPE) containing a eutectic agent making it possible to ensure the desired thermal stabilisation function. Any other thermal stabilisation element may however be envisaged.

To optimise the action of the thermal stabilisation elements 30, it is preferable to provide thermal insulation to avoid notably calorific loss and thus a modification of the conditioning temperature of the products in the inner box 20.

Thus, preferably at least one and preferably several thermal insulation panels 50 are provided arranged in a space formed between the outer box 10 and the thermal stabilisation element(s) 30. As specified above, these elements may notably be thermal insulation panels formed of rigid foams, made from for example extruded or expanded polystyrene, polyurethane, or vacuum insulated panels (VIPs).

According to a possible embodiment, a single element makes it possible to ensure both thermal stabilisation 30 and thermal insulation 50. Such an element may be in the form of a panel comprising one face forming the thermal stabilisation panel 30 and one face forming the thermal insulation panel 50.

Figure 2:
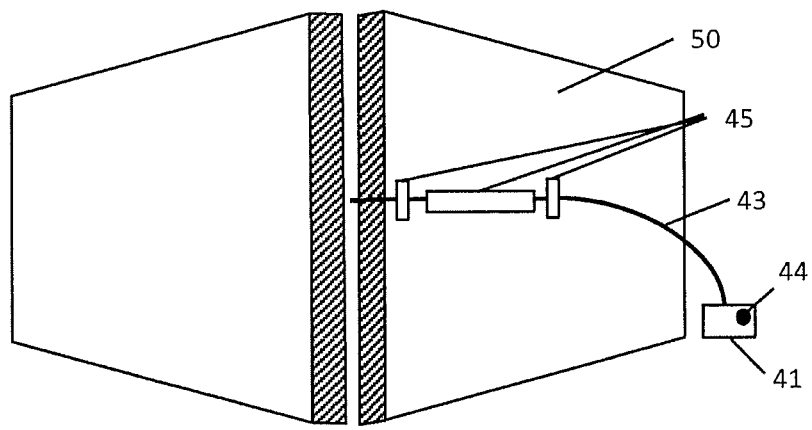
FIG. 2 is a schematic representation of the positioning of elements of a temperature monitoring system, according to a first embodiment, in the isothermal conditioning device of FIG. 1.
Figure 3:
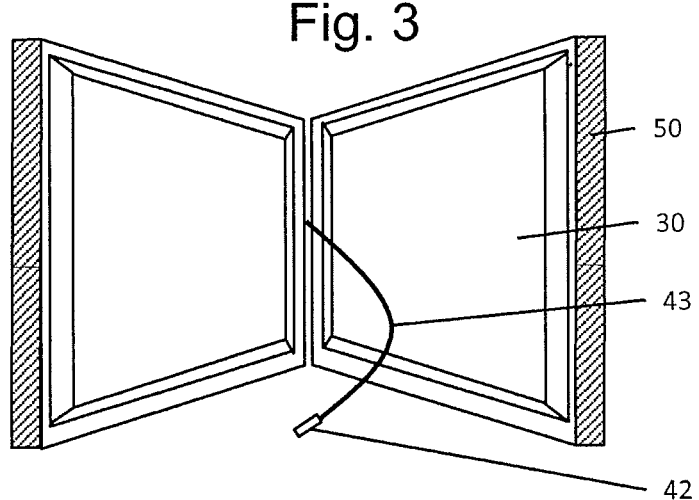
FIG. 3 is another schematic representation of the positioning of elements of a temperature monitoring system according to the first embodiment in the isothermal conditioning device of FIG. 1.
Figure 4:
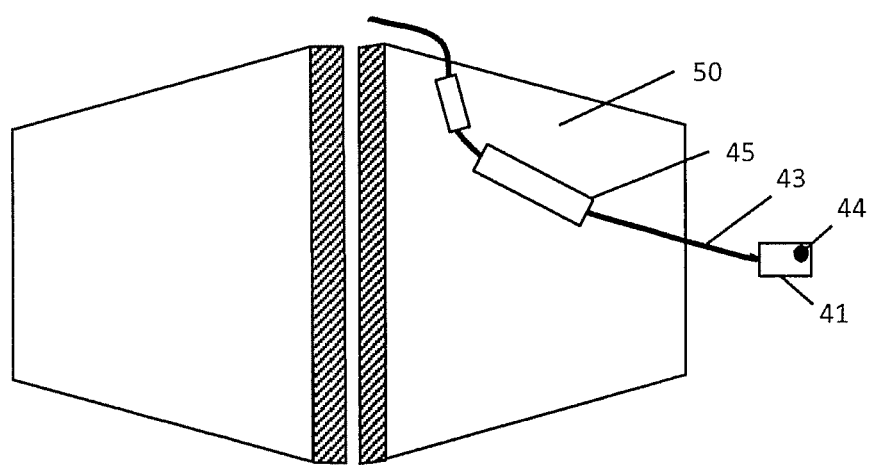
FIG. 4 is a schematic representation of the positioning of elements of a temperature monitoring system, according to a second embodiment, in the isothermal conditioning device of FIG. 1.

Finally, as illustrated in FIGS. 2 to 4, the isothermal conditioning device comprises a temperature monitoring system 40 comprising a data monitoring unit 41 and at least one temperature probe 42 coupled to the monitoring unit 41 by at least one cable 43.

The temperature probe 42 used may for example be of the thermoelectric type using a thermocouple or of the thermoresistive type based on the generation of a resistance as a function of temperature (e.g. platinum thermistors or resistors).

The monitoring unit 41 is intended to be fixed at the level of the first box 10. For example, the outer box 10 may comprise on an inner wall a housing intended to receive said monitoring unit 41. Such a housing may for example be formed by a double wall.

Further preferably, the monitoring unit 41 is in the form of a not very thick card or case to facilitate the layout at the level of the inner wall of the outer box 10.

Such a monitoring unit 41 comprises means for acquiring, processing, recording and/or communicating data coming from the temperature probe 42.

The NFC recording product sold by the BLULOG Company could for example be used as monitoring unit 41. A more precise description of this product is made in the international application published under the reference WO2016/118025 on the 28 Jul. 2016, the content of which is incorporated herein by reference in its entirety.

As indicated above, this monitoring unit 41 is connected by a cable 43 to a temperature probe 42, this temperature probe 42 is intended to be inserted into the second box 20 in order to measure the temperature within this inner box and to be able to verify the temperature evolutions of the conditioned products in the inner box 20.

The cable 43 used, comprising at least one wire and preferably several wires, may be of substantially circular section or of substantially flat section.

The monitoring unit 41 being arranged against an inner wall of the outer box 10, the cable 43 may for example be pressed against one of the thermal insulation panels 50, and preferentially maintained in position by any means such as adhesive tape 45, as is illustrated in FIGS. 2 and 4. It is to be noted that in the case where the conditioning device does not contain a thermal insulation panel, the cable 43 would then be pressed directly on one of the thermal stabilisation elements.

According to the embodiment illustrated in FIGS. 2 and 3, the cable 43 is positioned so as to reach the inner box 20 at the level of an angle between two side walls of the box, for example substantially at mid-height of the thermal insulation panel 50.

According to another embodiment illustrated in FIG. 4, the cable 43 is positioned so as to reach the box 20 at the level of the upper edge of the thermal insulation panel 50, for example close to one end of said upper edge, substantially contiguous with an angle formed between two side walls. According to this embodiment, it will be easier to position the temperature probe 42 inside the inner box 20 since it will be accessible by the user easily from above without requiring an additional length of cable 43.

Figure 5:
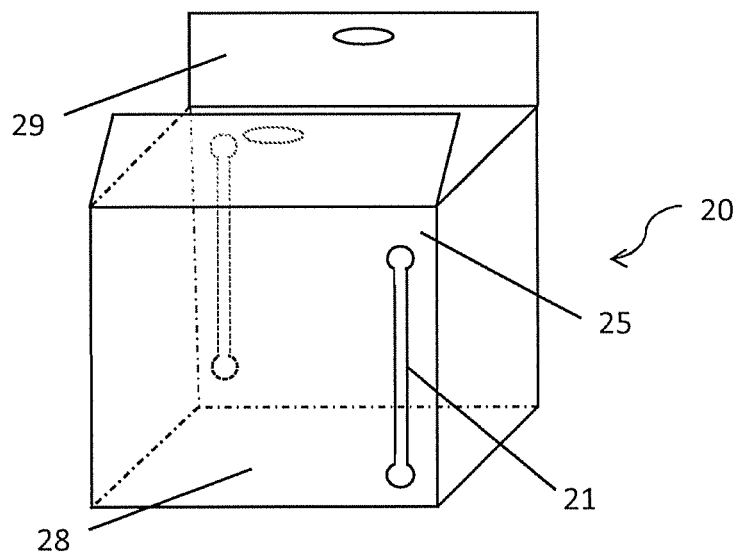
FIG. 5 is a schematic representation of the inner box of the isothermal conditioning device provided to receive a temperature probe, according to a first embodiment.

In order that the temperature probe 42 can measure the evolution of the temperature at the heart of the inner box 20, it is provided that this inner box 20 comprises at least one slot for positioning 21 the temperature probe 42 as illustrated in FIG. 5.

This positioning slot 21 comprises a maintaining portion 22 having a longitudinal shape, preferably straight, and a width provided to maintain the temperature probe 42 in position by compression. This maintaining portion 22 is thus dependent on the dimensions of the temperature probe 42 and the associated cable 43 that is going to be used. Conventionally, such a maintaining portion 22 may be as thin as a cutter blade as having a width of the order of several millimetres, as a function of the dimensions of the temperature probe 42. Thus, the maintaining portion 22 may have a width comprised between 0.1 mm and 5 mm, preferably between 0.5 mm and 3 mm, further preferably between 1 mm and 2 mm.

The material used for the panel in which the maintaining portion 22 is formed can also participate in the compression of the temperature probe 42 and thus to its maintaining in position. A polystyrene foam will have for example an elasticity that participates in this compression.

Furthermore, according to a preferred embodiment, the positioning slot 21 may further include at least one release portion 23 provided to enable an easy insertion and/or an extraction of the temperature probe 42, that is to say an insertion and/or an extraction of the temperature probe 42 with the minimum of constraint, notably with no or little friction.

In this respect, the release portion 23 has larger dimensions than the width of the maintaining portion 22 which is going to facilitate the insertion and/or the extraction of the temperature probe 42 with respect to the positioning slot.

Further preferably, the release portion 23 has larger dimensions than the section of the temperature probe 42 to enable this insertion and/or extraction with the minimum of friction.

The release portion 23 may have any shape, for example parallelepiped, oval, circular or other.

Preferably at least one release portion 23 is provided arranged in the positioning slot 21 so as to facilitate the extraction of the temperature probe 42 when the inner box 20 is taken out of the outer box 10, notably when the user wishes to recover the products having been conditioned in the isothermal conditioning device.

Preferably, the maintaining portion 22 extends longitudinally in a direction going from the lower face 28 of the inner box 20, corresponding to the bottom of the inner box 20 in use, to the upper face 29 of the inner box 20, corresponding to the cover of the inner box 20 for the loading of the products in the inner box 20. At least one release portion 23 is provided along the maintaining portion 22 on the side of the bottom 28 of the inner box 20, for example at the lower end of the maintaining slot 22.

Figure 6:
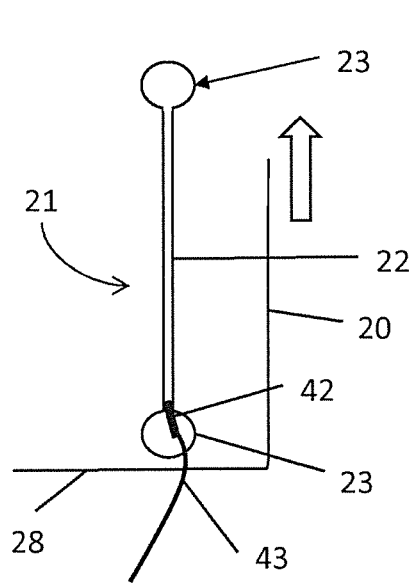
FIG. 6 is an illustration of the extraction of the inner box with respect to the outer box of the isothermal conditioning device.

Thus, in transport or storage phase in which the products are conditioned, the temperature probe 42 is maintained in position in the positioning slot 21. As illustrated in FIG. 6, when the inner box 20 is extracted from the outer box 10, along the direction indicated by the arrow, the temperature probe 42, which is maintained fixed with respect to the outer box 10, slides into the maintaining slot 22 until reaching the release slot 23 positioned at the level of the bottom 28 of the inner box 20. When the temperature probe 42 is at the level of the release slot 23, it is released naturally from the positioning slot 21 and the inner box 20 containing all the conditioned products may thus be released with respect to the outer box 10 without damaging the temperature probe 42.

During the placement of the temperature probe 42 in the inner box 20, it is possible to use the release portion 23 in order to insert the temperature probe 42 through the positioning slot 21, and said temperature probe 42 is slid into the maintaining portion 22.

It may be advantageous to provide several distinct release portions 23, and in particular at least two, the first release portion 23 being provided for the extraction of the temperature probe 42 when the inner box 20 is extracted from the outer box 10, and a second release portion 23 being provided for the insertion of the temperature probe 42 and its positioning in the maintaining portion 22.

Figure 7:
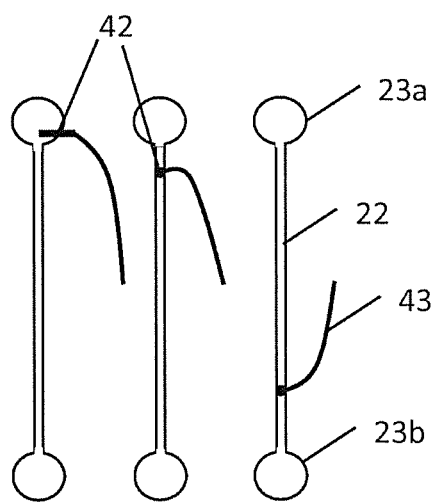
FIG. 7 is an illustration of the placement of a temperature probe in a positioning slot arranged in the inner box of the isothermal conditioning device.

In FIGS. 5 to 7 is illustrated an embodiment where the positioning slot 21 has two release portions 23 positioned at each end of the maintaining portion 22. The maintaining slot extends between the bottom 28 of the inner box 20 and the cover 29 of the inner box 20.

FIG. 7 illustrates the placement of the temperature probe 42 in the positioning slot 21 of the inner box 20. Such a placement is particularly easy with the positioning of the cable 43 such as illustrated in FIG. 4 and described above.

As may be seen in this FIG. 7, the temperature probe 42 is firstly placed in the release portion 23*a* placed on the side of the cover 29 of the inner box 20, that is to say at the level of the top of the inner box. The temperature probe 42 is next progressively slid into the maintaining portion 22 according to the required layout so that the sensor of the temperature probe 42 is placed in an optimal manner with respect to the conditioned products in the inner box 20.

The inner box 20 may thus be loaded beforehand by products such as medicines. The putting in place of the temperature probe 42 may be done after the putting in place of the inner box 20 with the products in the outer box 10. During the reception of the isothermal conditioning device and the removal of the merchandise, the cable 43 of the temperature probe 42 is not always visible. If the user removes the inner box 41 without paying attention to the temperature probe 42, the temperature probe 42 is going to slide into the incision 21 up to the lower opening 23 which thereby enables the separation of the inner basket 20 from the outer box 10 while minimising, or even totally avoiding, pull-out of the temperature probe 42.

The positioning slot 21 may be formed by a cut through a panel 25 forming one of the walls of the inner box 20. The positioning slot 21 may for example be formed on a side panel of the inner box 20, notably one of the panels of greatest length.

In the embodiment illustrated in FIG. 5, the inner box 20 comprises two positioning slots formed in the box on two opposite faces of the box.

It is in fact advantageous to have several positioning slots 21 formed on a same inner box 20 intended to receive the products to condition. Indeed, this makes it possible to place the temperature probe 42 at several different places of the inner box 20, or even potentially to place several different temperature probes, which may be particularly interesting for large volume boxes where temperature differences in different zones of the box could be observed.

Figure 8:
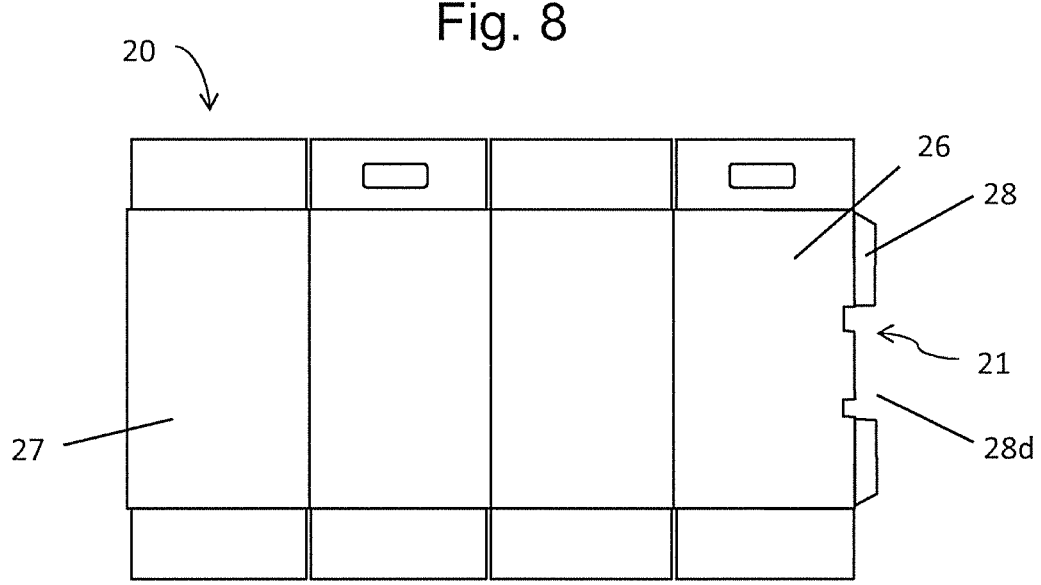
FIG. 8 is a schematic representation of the inner box of the isothermal conditioning device provided to receive a temperature probe, according to a second embodiment.
Figure 9:
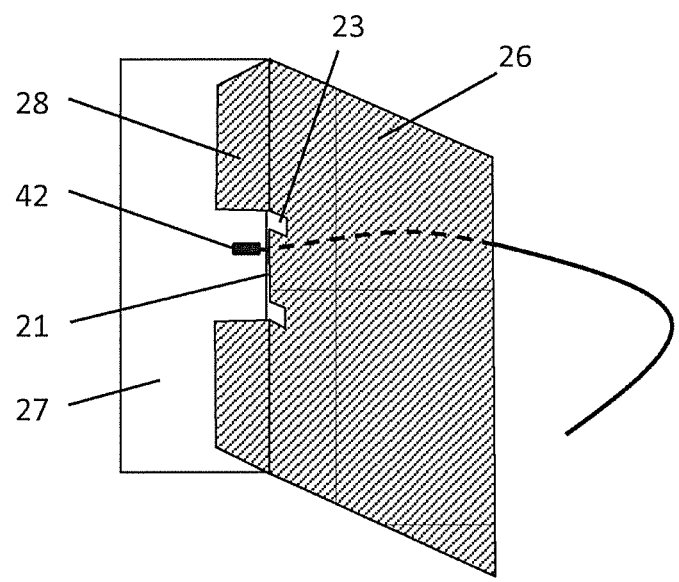
FIG. 9 is a schematic representation of the inside of the inner box of FIG. 8 with the temperature probe.

According to another embodiment such as illustrated in FIGS. 8 and 9, the positioning slot 21 is formed by a cut of an edge of a panel 26 forming one of the walls of the inner box 20 and by cooperation with an edge of a panel 27 forming an adjacent wall during the manufacture of the second box 20. Thus, the positioning slot 21 is formed during the assembly of the inner box 20, when the panels are associated to form the inner box 20.

The inner box 20 may further comprise a flap portion 28 which is useful for the assembly of two free panels (26,27) and intended to be adjacent once the box is formed. According to an advantageous example, said flap portion 28 comprises a cut 28*d* which is provided to facilitate the positioning of the temperature probe 42 in the inner box 20 and to protect it with respect to the products contained in the inner box 20.

Indeed, as may be seen represented in FIG. 9, the temperature probe 42 may be positioned against the wall of the panel 27 adjacent to the panel 26 comprising the flap 28, in a manner substantially parallel to said flap 28.

The cut 28*d* formed in the thickness of the flap 28 forms a cavity into which the temperature probe 42 may be slid more easily without being hindered by the products. This embodiment also makes it possible to protect the temperature probe 42 from the products placed in the inner box 20 since they abut against the wall of the flap 28.

According to an additional embodiment, it is possible that the temperature monitoring system 40 is provided with an additional temperature probe 44 coupled to the monitoring unit 41 and intended to be positioned on the first box 10 to measure the temperature at the level of the first box 10.

Such a temperature monitoring system 40 making it possible to measure both the temperature in the inner box 20 and at the level of the outer box 10, that is to say outside of the thermally insulated and stabilised space, is particularly advantageous because it makes it possible to monitor and to interpret temperature evolutions in greater detail, and to have the most suitable potential corrective actions.

It is to be noted that the additional temperature probe 44 may be directly integrated in the monitoring unit 41 since it has to be positioned at the level of the outer box 10 just like the monitoring unit 41.

The inner box 20 such as in the embodiment illustrated in FIG. 5 may be a box with flaps, these flaps being able to be cut or not to form a handle in order to facilitate the unloading of the box. The walls of this inner box 10 may for example be composed of polystyrene foam covered with paper or plastic coating, but may also be constituted of other materials.

The outer box 10 is preferentially formed of a light and resistant material, so as to protect the conditioned products in the inner box 20 but also the thermal stabilisation elements 30 and optional thermal insulation panels.

BIBLIOGRAPHIC REFERENCES

"A Bluetooth-Smart Insulating Container for Cold Chain Logistics"/Chou et al.
WO 2016/118025

The invention claimed is:

1. A device for conditioning products intended to maintain the products within a determined temperature range, comprising
a first box of parallelepiped shape;
a second box of parallelepiped shape in which the products are intended to be conditioned, the second box having overall dimensions less than the first box and being intended to be positioned inside the first box in a removable manner;
a thermal stabilisation element intended to be positioned in a space formed between the first box and the second box when the second box is positioned in the first box;

a temperature monitoring system comprising a data monitoring unit and a temperature probe coupled to the monitoring unit by a cable, characterised in that the monitoring unit is intended to be fixed onto the first box and in that the temperature probe is intended to be inserted into the second box, the second box comprising a positioning slot for positioning the temperature probe, said positioning slot comprising a maintaining portion having a longitudinal shape and a width provided to maintain the temperature probe in position by compression.

2. The device of claim 1, wherein the positioning slot further comprises a release portion for releasing the temperature probe, said release portion having dimensions larger than the width of the maintaining portion so as to enable an insertion and/or an extraction of the temperature probe.

3. The device of claim 2, wherein the release portion is arranged at one end of the maintaining portion.

4. The device of claim 1, wherein the positioning slot comprises two release portions arranged respectively at each of the ends of the maintaining portion.

5. The device of claim 1, wherein the positioning slot is formed by a cut through a panel forming one of the walls of the second box.

6. The device of claim 1, wherein the positioning slot is formed by a cut of an edge of a panel forming one of the walls of the second box and by cooperation with an edge of a panel forming an adjacent wall during the manufacture of the second box.

7. The device of claim 1, wherein the second box further comprises a flap portion provided to assemble two adjacent panels, said flap portion comprising a cut in which the temperature probe is intended to be positioned.

8. The device of claim 1, wherein the second box comprises an upper wall, a lower wall opposite the upper wall, and four peripheral walls perpendicular two by two and opposite two by two and each extending between the upper wall and the lower wall, the positioning slot being formed at the level of one of the panels forming the peripheral walls and along a direction extending between the lower wall and the upper wall.

9. The device of claim 1, wherein the second box comprises a plurality of positioning slots making it possible to position the temperature probe at various positions or to position several temperature probes in the second box.

10. The device of claim 1, wherein the temperature monitoring system comprises an additional temperature probe coupled to the monitoring unit, said additional temperature probe being intended to be positioned on the first box to measure the temperature at the level of the first box.

11. The device of claim 10, wherein the additional temperature probe is integrated in the monitoring unit.

12. The device of claim 1, wherein the monitoring unit is configured to at least one of acquire, process, record, and communicate data coming from the temperature probe.

13. The device of claim 1, wherein the monitoring unit is in the form of a card intended to be fixed onto an inner wall of the first box.

14. The device of claim 1, wherein the first box comprises on an inner wall a housing intended to receive the monitoring unit.

15. The device of claim 1, further comprising at least one thermal insulation panel intended to be positioned in a space formed between the first box and the at least one thermal stabilisation element.

* * * * *